(12) United States Patent
Ajmera et al.

(10) Patent No.: US 8,869,684 B2
(45) Date of Patent: Oct. 28, 2014

(54) BOTTOM ACCESS DOLLIES FOR CONVEYOR OVEN

(76) Inventors: Sam Ajmera, Concord (CA); Tejus Ajmera, Concord (CA); Dragan Janus, Concord (CA); Peter Janus, Concord (CA)

( * ) Notice: Subject to any disclaimer, the term of this patent is extended or adjusted under 35 U.S.C. 154(b) by 570 days.

(21) Appl. No.: 13/054,241

(22) PCT Filed: Jul. 16, 2008
(Under 37 CFR 1.47)

(86) PCT No.: PCT/CA2008/001316
§ 371 (c)(1),
(2), (4) Date: Aug. 1, 2011

(87) PCT Pub. No.: WO2010/006403
PCT Pub. Date: Jan. 21, 2010

(65) Prior Publication Data
US 2012/0040066 A1    Feb. 16, 2012

(51) Int. Cl.
*A21B 1/48* (2006.01)
*A21B 3/00* (2006.01)
*B62B 3/00* (2006.01)

(52) U.S. Cl.
CPC ............. *A21B 1/48* (2013.01); *B62B 2204/06* (2013.01); *A21B 3/00* (2013.01); *B62B 2204/04* (2013.01); *B62B 2204/02* (2013.01); *B62B 3/00* (2013.01)
USPC ..................................................... 99/443 R

(58) Field of Classification Search
USPC ....... 99/386, 387, 391, 393, 400, 443 C, 444, 99/477
See application file for complete search history.

(56) References Cited

U.S. PATENT DOCUMENTS

| | | | |
|---|---|---|---|
| 980,680 | A | 1/1911 | Ross |
| 1,711,143 | A | 4/1929 | Gloekler |
| 2,305,056 | A | 12/1942 | Austin |
| 3,088,396 | A | 5/1963 | Proffitt |
| 3,357,475 | A | 12/1967 | Schweitzer |

(Continued)

FOREIGN PATENT DOCUMENTS

| | | |
|---|---|---|
| AU | 580536 B3 | 3/1988 |
| CA | 1148815 A | 6/1983 |

(Continued)

OTHER PUBLICATIONS

Restaurants & Institutions, Apr. 1, 1995, pp. 58-76, "Authentic Ethnics", by Johnson.

(Continued)

*Primary Examiner* — Tu B Hoang
*Assistant Examiner* — Brandon Harvey
(74) *Attorney, Agent, or Firm* — McDonnell Boehnen Hulbert & Berghoff LLP

(57) ABSTRACT

A conveyor oven is provided, which has an oven housing having a frame with a top wall and side walls downwardly dependent from the top wall, and a substantially open bottom portion of the frame. A heat source heats the baking chamber in excess of 7000 F. An endless conveyor is used for continuous transport of foodstuffs through the baking chamber. The oven uses access dollies to insulatingly cover the bottom of the oven below the conveyor. These dollies can be unsealed and slidably removed to access the baking chamber without turning off the heat source or cooling the oven.

5 Claims, 3 Drawing Sheets

(56) References Cited

U.S. PATENT DOCUMENTS

| | | | |
|---|---|---|---|
| 3,861,378 A * | 1/1975 | Rhoads et al. | 126/21 A |
| 3,993,788 A | 11/1976 | Longenecker | |
| 4,023,007 A | 5/1977 | Brown | |
| 4,045,166 A | 8/1977 | Kaleel | |
| 4,188,868 A | 2/1980 | Baker et al. | |
| 4,202,911 A | 5/1980 | Papantoniou et al. | |
| 4,252,055 A | 2/1981 | Johansson et al. | |
| 4,383,823 A | 5/1983 | Williams et al. | |
| 4,389,562 A | 6/1983 | Chaudoir | |
| 4,462,307 A | 7/1984 | Wells | |
| 4,504,221 A | 3/1985 | Hartmann | |
| 4,542,268 A | 9/1985 | Jarvis et al. | |
| 4,591,333 A | 5/1986 | Henke | |
| 4,599,938 A * | 7/1986 | Gongwer | 99/446 |
| 4,739,154 A | 4/1988 | Bharara et al. | |
| 4,951,648 A * | 8/1990 | Shukla et al. | 126/21 A |
| 5,686,004 A | 11/1997 | Schneider | |
| 5,826,496 A * | 10/1998 | Jara | 99/443 C |
| 5,832,810 A * | 11/1998 | Brawley et al. | 99/408 |
| 5,979,302 A | 11/1999 | Funk et al. | |
| 6,291,002 B1 * | 9/2001 | Goglanian | 426/496 |
| 6,425,388 B1 | 7/2002 | Korinchock | |
| 6,550,373 B2 | 4/2003 | Hafezan et al. | |
| 6,707,014 B1 | 3/2004 | Corey et al. | |
| 6,776,612 B2 | 8/2004 | Backowski et al. | |
| 6,933,473 B2 | 8/2005 | Henke et al. | |
| 7,026,579 B2 | 4/2006 | Burtea | |
| 7,091,452 B2 | 8/2006 | Kingdon et al. | |
| 2003/0041851 A1 | 3/2003 | Kingdon et al. | |
| 2003/0196346 A1 | 10/2003 | Schmidt | |
| 2005/0235980 A1 | 10/2005 | Hansen et al. | |
| 2007/0006865 A1 | 1/2007 | Wiker et al. | |
| 2011/0020492 A1 | 1/2011 | Ajmera et al. | |
| 2011/0151052 A1 | 6/2011 | Ajmera et al. | |
| 2012/0189743 A1 | 7/2012 | Ajmera et al. | |
| 2012/0270171 A1 | 10/2012 | Ajmera et al. | |

FOREIGN PATENT DOCUMENTS

| | | |
|---|---|---|
| CA | 2210967 A1 | 1/1998 |
| CA | 2343881 A1 | 10/2000 |
| DE | 2107220 A1 | 8/1972 |
| FR | 2398459 | 2/1979 |
| FR | 2565068 A1 | 12/1985 |
| GB | 2290448 A | 1/1996 |
| IN | 139746 A1 | 7/1976 |
| IN | 145178 A1 | 9/1977 |
| WO | 88/01719 A1 | 3/1988 |
| WO | 82/02475 A1 | 8/1992 |
| WO | 98/15185 A1 | 4/1998 |

OTHER PUBLICATIONS

Office Action-Restriction-mailed Feb. 27, 2012 in co-pending U.S. Appl. No. 13/040,790.

Recipetips.com, Naan Bread, Definition and Cooking Information, www.recipetips.com/glossary-term/t-34773/naan-bread.asp, , 2 pages, Apr. 10, 2004.

Webster's Online Dictionary, Definition of "Naan", www.websters-online-dictionary.org/definition/NAAN, 4 pages, Jun. 17, 2005.

Spiritual Practice, Krsna Prasadam, NAAN bread recipes, www.harekrsna.com/practice/prasadam/recipes/breads5.htm, 5 pages, May 15, 2005.

Taste of Life, Naan Bread recipe, www.tasteoflife.com/097_03.html, 2 pages, Sep. 30, 2002.

Indian Food Forever, Naan Bread recipe, www.indianfoodforever.com, 3 pages, Jul. 29, 2005.

International Preliminary Report on Patentability issued Mar. 31, 2009 in co-pending PCT application No. PCT/CA2006/001612.

Office Action mailed Dec. 18, 2012 in co-pending U.S. Appl. No. 13/432,795.

Office Action mailed Jan. 15, 2013 in co-pending U.S. Appl. No. 13/040,790.

International Search Report dated Dec. 3, 2008 in corresponding foreign application PCT/CA2008/001316.

International Search Report dated Apr. 15, 2009 in co-pending foregn application PCT/CA2008/001317.

Food Manufacture, Feb. 2000, pp. 38-39, "Naan Bread Revolution", Darrington, H.

Restaurants & Institutions, Apr. 1, 1995, pp. 62-76, "Authentic Ethnics India: Spices Provide India with a Wealth of Flavorings Known to no other culinary repertoire", Johnson, B. A.

Baking & Snack, Dec. 1996, vol. 18, No. 11, pp. 46-52, "The facts about flat bread processing", Gorton, L.

British Baker, Sep. 21, 2001, pp. 18-24, "Tunnel Ovens: Winning the space race".

http://en.wikipedia.org/wiki/Tandoor, definition of "Tandoor", Sep. 19, 2006.

http://en.wikipedia.org/wiki/Naan, definition of "Naan", Sep. 19, 2006.

California Conference of Director of Environmental Health, Jul. 1999, "Guidelines for the Installation and Use of Tandoor Ovens", pp. 1-3.

www.beechovens.com, "Beech Ovens: Reinventing Tandoori Technology", (Sep. 19, 2006), pp. 1-8.

www.beechovens.com.au/index.php?pg=tan, "Beech Ovens: Manufacturer of Wood Fired Ovens and Gas Stone Hearth Ovens for the World's Leading Hoteliers", Sep. 19, 2006, copyright 1999-2006, pp. 1-6.

International Search Report dated Jun. 13, 2007 in co-pending foreign patent application PCT/CA20061001612.

Written Opinion of the International Searching Authority dated Dec. 3, 2008 in corresponding foreign application CA2008/001316.

International Preliminary Report on Patentability issued Jan. 18, 2011 in corresponding foreign application PCT/CA2008/001316.

Written Opinion of the International Searching Authority dated Apr. 15, 2009 in co-pending foreign application PCT/CA2008/001317.

International Preliminary Report on Patentabiity issued Jan. 18, 2011 in co-pending foreign application PCT/CA2008/001317.

UK Communication dated May 23, 2011 in co-pending foreign patent application No. GB0820448.9, 1 page.

Mewburn Ellis 3dP Observations, dated May 13, 2011, 19 pages, regarding co-pending foreing patent application No. GB0820448.9.

Prepared Foods, Oct. 2006, pp. 11-18, "'Naan' too Soon", Roberts, W.A.

The Globe and Mail, Oct. 9, 2006, 3 pages, "The world is flatbread for bakery behind PC naan", Strauss, M.

USPTO Trademark Serial No. 78949769, http://tess2.uspto.gov/bin/showfield?f=doc&state=4008:b3s5sk.2.1, accessed Apr. 15, 2011.

The Best Recipe, by the editors of Cook's Illustrated, 1999, pp. 333-337.

Office Action dated Jul. 21, 2011 in co-pending U.S. Appl. No. 12/310,827.

Final Rejection mailed Sep. 26, 2012 in co-pending U.S. Appl. No. 12/310,827.

Atwell, William A., "Chapter 6, Products From Hard Wheat Flour: Problems, Causes, and Resolutions," in: Wheat Flour, (Eagan Press Handbook Series, 2001), pp. 79-95.

C.H. Babb Co., Inc., "For Mideast Bread Ovens or Fully Automated Bakery Systems," brochure, allegedly available as of 2004.

Captures of C.H. Babb Co., Inc. website from 2004 [WaybackMachine], [retrieved on Aug. 19, 2013]. Retrieved from the Internet <URL: web.archive.org/web/20040206203406/http://babbco.com/ovens.html>.

"The Fabulous Indian Breads." Available online at www.angelfire.com on Dec. 15, 2005.

Food Machinery Engineering Brochure, "Arabic Bread Oven Model K-174," (unknown date).

Fredrich et al. "Micromechanics of Thermally Induced Cracking in Three Crystal Rocks," Journal of Geophysical Research, vol. 91, No. B12, p. 12,743-12,744. Nov. 10, 1986.

Khurana, Laxmi, "An Indian Housewife's Recipe Book," Jaico Publishing House, 1996, pp. 12-13.

(56) References Cited

OTHER PUBLICATIONS

Meredith, P.G. et al. "Fracture Toughness and Subcritical Crack Growth During High-Temperature Tensile Deformation of Westerly Granite and Black Gabbro," Physics of the Earth and Planetary Interiors, 39 (1985) 33-51. Elsevier Science Publishers B.V., Amsterdam.

Qarooni, Jalal, "Flat Bread Technology," International Thomson Publishing, pp. 98-101, 194-201, 1996.

Rai, Ranjit, "Construction of the Tandoor" and "Tenderizers" in: Tandoor: The Great Indian Barbeque, (Overlook Press, 2001), pp. 104-105.

The Tile Man Inc., "Vintage Tile Pattern," [retrieved on Apr. 20, 2005]. Retrieved from the Internet <URL: http://www.thetileman.com/vintage.html>.

Wang, et al. "Thermal Stress Cracking in Granite," Journal of Geophysical Research, vol. 94, No. B2, p. 1745-1758. Feb. 10, 1989.

* cited by examiner

BOTTOM ACCESS DOLLIES FOR CONVEYOR OVEN

FIELD OF THE INVENTION

The invention relates to commercial baking ovens, and more particularly to commercial baking ovens using an endless conveyor.

BACKGROUND OF THE INVENTION

Conveyor ovens are increasingly popular in commercial baking. Food to be baked (such as, unbaked loaves of bread) is loaded on a continuous conveyor which passes through a heated oven chamber to emerge in baked form on the other side. In order to be efficient, such ovens must be carefully sealed and insulated to retain heat. Cooling the oven for maintenance and cleaning takes a long time—as much as several hours.

In the course of use, debris tends to accumulate in the bottom of the oven, below the conveyor—crumbs, loose flour, grease and sugar drippings, and even pieces of food can be trapped or fall through the conveyor, which is often of loosely linked chain. These combustibles can and do cause fires in the oven.

Accessing the interior of the oven can be problematic, especially in the event of a fire. There is frequently not enough time to completely cool the oven to access the source of the fire and extinguish it. Left unchecked, a fire can cause tremendous damage to the oven, surrounding areas, and may even cause human injury.

The problem of debris in ovens has been recognized. Some have proposed crumb trays or drip trays as a means of collecting the debris. However, such solutions do not address the fire risk from the debris. The trays are not insulated or fireproof, nor do they provide any assistance for accessing a source of fire, while the oven is in operation.

Typically, the trays are provided in a relatively low baking temperature oven (such as for restaurant foods), in which heat loss through the bottom of the oven is not a huge efficiency or safety issue. However, these are not convenient for high temperature conveyor ovens, where the oven must be a carefully enclosed space.

It would be desirable to provide greater accessibility to the bottom portion of the oven while it is in operation without sacrificing sealed/insulated efficiency.

SUMMARY OF THE INVENTION

According to a first aspect of the present invention, a conveyor oven is provided. An oven housing is mounted on leg supports. The housing has a frame with a top wall and side walls downwardly depending from the top wall. The bottom portion of the frame is substantially open. The frame, top wall and side walls define an interior baking chamber. The oven is heated by a heat source (such as, gas), which is capable of heating the baking chamber to a temperature in excess of 700° F. Inside the oven, an endless conveyor is mounted for continuous transport of foodstuffs through the baking chamber. The oven has at least one access dolly disposed below the frame of the oven housing between the leg supports. The access dolly sealingly engages the oven bottom below the conveyor. When in place, the access dolly serves as the oven's bottom wall, providing a sealed, insulated cover. The dolly can be unsealed and slidably removed from the bottom of the oven to access the baking chamber without turning off the heat source or cooling the oven.

The dolly is easily removable from the oven bottom for quick access. The dolly may have wheels for slidably removing it from the oven. Alternatively, another sliding mechanism may be provided (e.g. the dolly may slide on rails or tracks, like a drawer).

The oven walls are insulated to contain the high heat. The dolly serves as a bottom wall, and is preferably insulated with the same material as the oven's fixed walls. The insulating material may be rock wool. Other insulation layers may be provided. The oven walls and dolly may be further insulated with sand or firebrick or empty air. Preferably, the dolly is clad in a fire resistant material, similar to the oven walls, such as steel. Alternative coverings/coatings are possible, including ceramic or stone.

According to a second aspect of the invention, a method is provided for operating a conveyor oven. The conveyor oven is heated to a temperature in excess of 700° F. Foodstuffs are carried through the oven's baking chamber on the conveyor. If an area of the oven needs to be accessed while the oven is in operation, a removable dolly can be pulled out from the bottom of the oven proximate to the area. The dolly is unsealed from the bottom of the oven, and removed by wheeling it away from oven housing without shutting off oven heat source or cooling the oven. This allows the area to be accessed for clearing debris or fighting fires. The removable dolly is then replaced by wheeling it back into place and resealing it to the oven housing.

According to a third aspect of the present invention, a removable dolly is provided for a conveyor oven. The dolly has an insulated platform with a surface that is sealable against the oven bottom. The insulated platform is adapted to withstand oven temperatures in excess of 700° F. The platform is provided with wheels to permit the dolly to be moved while the conveyor oven is in operation.

DETAILED DESCRIPTION OF THE DRAWINGS

Figure 1:
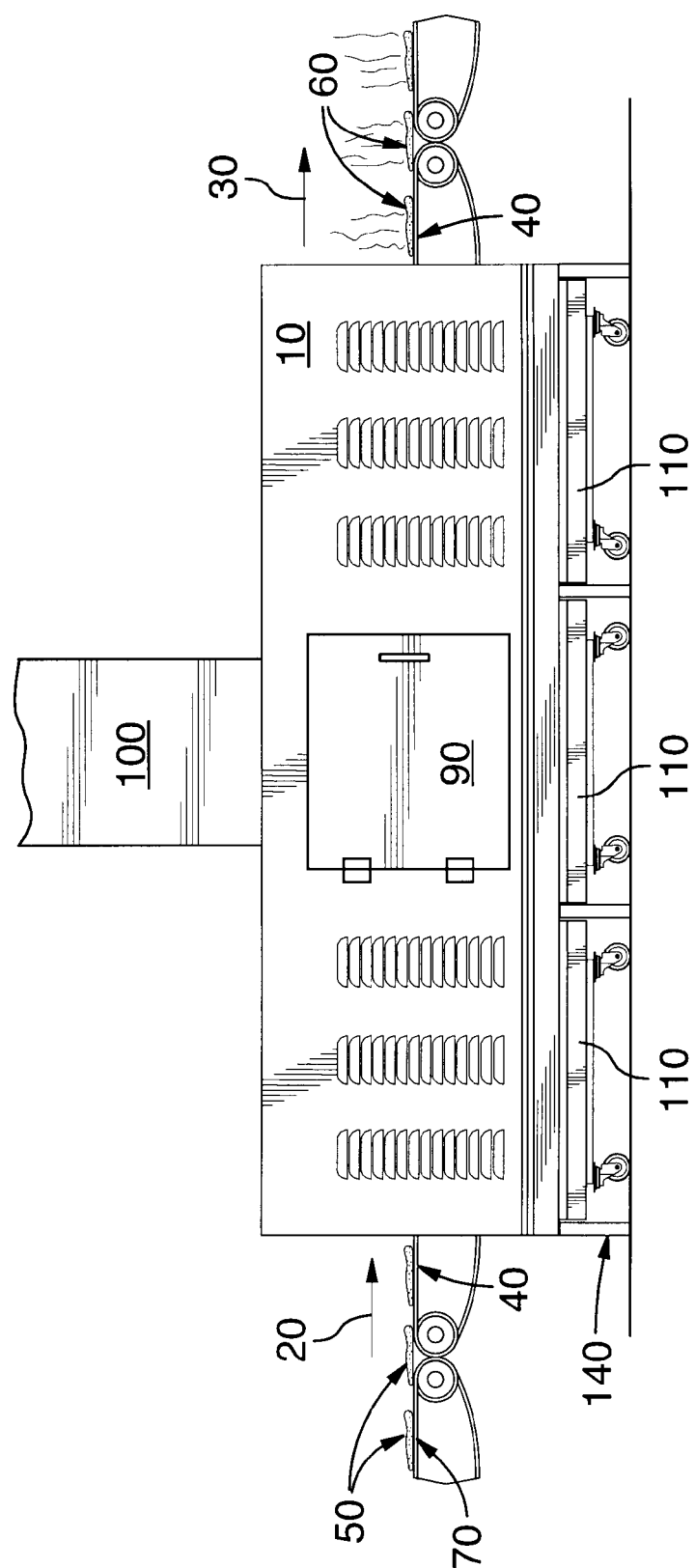
FIG. 1 is a side view of a conveyor oven according to a preferred embodiment of the invention, showing dollies in place under the oven.

A conveyor oven 10 is provided. A conveyor 40 takes unbaked foodstuffs 20 from a loading conveyor 70 and transports them through a baking chamber. After baking, the foodstuffs 60 are transferred to a cooling conveyor 80.

The conveyor oven 10 is a high temperature baking oven capable of baking in excess of 700° F. (and more preferably preferably in excess of 1000° F.). This high temperature bake is particularly suited to certain types of flatbreads, particularly naan bread, lavash, and focaccia, wherein a certain amount of charring is considered desirable. The temperature is well above the normal baking temperature of standard loaf breads, muffins, pizza (typically, in the range of 300° F. to 600° F.). This high temperature makes the oven particularly susceptible to sudden and very dangerous fires.

The oven housing is basically an insulated box. Input opening is provided at 20. An output opening is provided at 30. One or more exhaust chimneys 100 are provided. Of particular interest in the present invention, the oven housing is provided on leg supports 140. The oven bottom is open—it does not have fixed walls or cladding. To seal the bottom of the oven for heat maintenance, access dollies 110 are provided. The dollies 110 are platforms of material identical to that in the walls and ceiling of the oven housing. The dollies 110 are wheeled or otherwise slidable out from between the legs 140 of the oven to access the oven baking chamber. This is particularly advantageous for accessing the oven in the event of an emergency, such as a sudden fire or blockage in the oven. The dollies 110 are removable while the oven is in operation, without lowering the oven temperature or turning off the conveyor 40.

Figure 2:
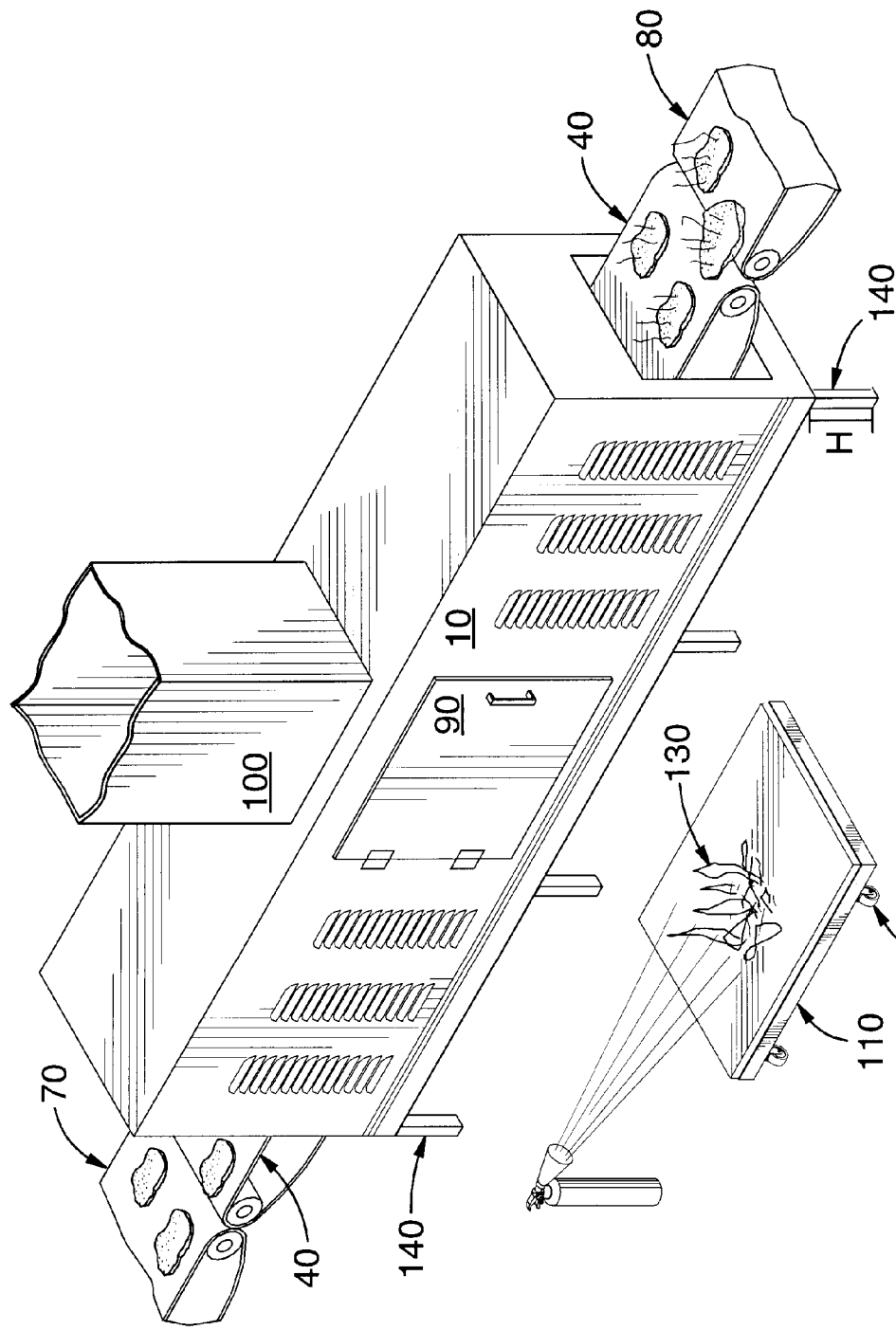
FIG. 2 is a side view of the conveyor oven of FIG. 1, showing one of the dollies removed for fighting a fire.
Figure 3:
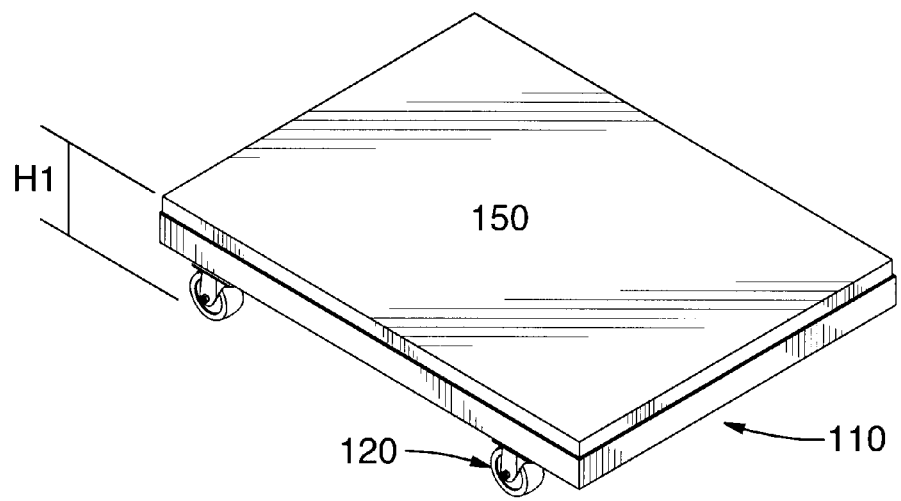
FIG. 3 is a perspective view of a dolly removed from the oven.
Figure 3A:
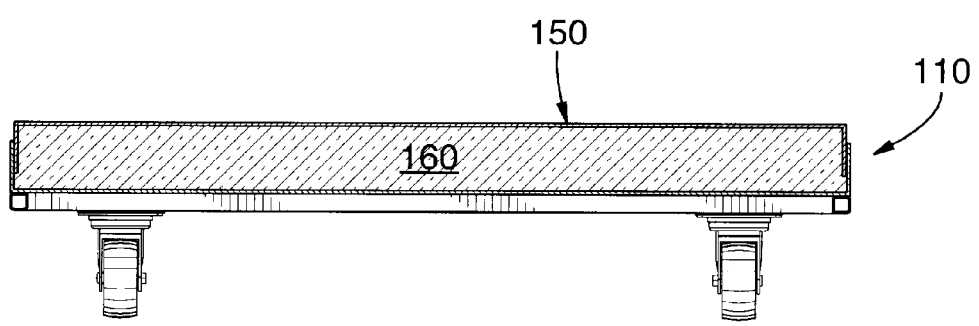
FIG. 3A is a sectional view of a dolly.

The dolly 110 preferably has a flat top surface 150 which acts similar to a "crumb catcher". (However, in contrast to prior art crumb catchers, the dolly is insulated and is able to withstand very high heat. So, in fact, it has more in common with the insulated fixed walls of the oven itself.) As shown in FIG. 2, in the event of a fire, the dolly may itself carry the combustion materials 130 which can then be extinguished. Alternatively, the combustion materials may fall through from the oven baking chamber when the bottom is opened. The dolly 110 is insulated 160 and itself clad in fire resistant material (as shown in FIG. 4), such as steel. The oven baking chamber can also be accessed (with appropriate safety precautions) to remove a blockage, or extinguish fires.

The dolly is preferably wheeled 120, such as with casters or rotary wheels. With the wheels 120, the height of the platform (H1) is such that its top surface sealingly engages the frame of the oven housing, thus forming an integral part of the oven itself when installed as usual. The overall height of the dolly is preferably between 6 to 12 inches. However, less important than the actual height, is the relationship of the dolly's height to the height of the space beneath the oven (H—the height of leg supports). H1 and H should be approximately equal in order to provide an effective sealing engagement and prevent heat loss.

The dolly may be provided with side rails (not shown) to enhance the ability to pull them away from the oven bottom as needed.

The number of dollies 110 provided may be any number. This will necessarily depend on the number of between-leg spaces provided, which in turn depends on the overall construction and length of the oven housing itself.

The access dollies should not be confused with side access doors 90 which are a usual part of most conveyor ovens. Such side access doors are useful to provide an access means when the oven is not in operation. However, in the event of a fire or other emergency, the side access door 90 cannot be opened without severe risk of injury and/or spreading of the fire, escape of smoke, etc.

By contrast, the access dollies 110 are safe to remove while the oven is in operation because the fire and smoke are not going to burn downward, but upward. Opening the bottom will not intensify the fire. The bottom is the coolest part of the oven, therefore, the least dangerous to access.

In construction, the dolly 110 is like a chunk of the wall material itself. It is an insulated platform, clad with a fire-resistant material, such as steel. The insulation 160 may be rock wool. Multiple layers of insulation may be provided.

Weight of the dollies is a factor. Although the dollies are slid, not lifted, it is preferably to keep the weight of the dollies relatively light (under approximately 100 lbs) to make them manageable to be moved quickly.

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. Accordingly, all suitable modifications, variations and equivalents may be resorted to, and such modifications, variations and equivalents are intended to fall within the scope of the invention as described and within the scope of the claims.

The invention claimed is:

1. A conveyor oven, comprising:
an oven housing having a frame with a top wall and side walls downwardly dependent from the top wall, a bottom portion of the frame defining an opening of the oven to allow combustion materials to fall through the opening; the frame, top wall and side walls defining an interior baking chamber;
the oven housing being mounted on leg supports;
a heat source for heating the baking chamber in excess of 700° F.;
an endless conveyor mounted within the oven housing for continuous transport of foodstuffs through the baking chamber, said conveyor disposed directly above the opening;
a plurality of access dollies having a fire resistant upper surface and an insulating material below said upper surface, said plurality of access dollies disposed below the frame of the oven housing between the leg supports and having means for sliding between a sealing position below the opening and an open position removed from the opening, wherein in the sealing position the plurality of access dollies form a bottom wall of the oven housing with the fire resistant upper surface in sealing engagement with the bottom portion of the frame to seal and insulatingly cover the opening below the conveyor to prevent heat loss from the baking chamber, and wherein the dollies are unsealable and slidably removable from the sealing position below the conveyor to the open position to provide access to the baking chamber below the conveyor without turning off the heat source or cooling the oven.

2. The conveyor oven of claim 1, wherein the dolly means for sliding comprises wheels for rolling along a floor surface to slidably transition the dolly between the sealing position and the open position.

3. The conveyor oven of claim 1, wherein the top wall and side walls are further insulated with the insulating material.

4. The conveyor oven of claim 3, wherein the insulating material comprises rock wool.

5. The conveyor oven of claim 1, wherein the fire resistant surface comprises steel.

* * * * *